United States Patent
Uruno et al.

(10) Patent No.: US 7,551,462 B2
(45) Date of Patent: Jun. 23, 2009

(54) SOFT SWITCHING DC-DC CONVERTER INCLUDING A BUCK CONVERTER AND A BOOST CONVERTER SHARING A COMMON TRANSFORMER

(75) Inventors: Junpei Uruno, Naka (JP); Hiroyuki Shoji, Hitachi (JP); Akihiko Kanouda, Hitachinaka (JP); Yasuo Kaminaga, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/348,348

(22) Filed: Feb. 7, 2006

(65) Prior Publication Data

US 2006/0176719 A1    Aug. 10, 2006

(30) Foreign Application Priority Data

Feb. 8, 2005    (JP) ............................ 2005-031216

(51) Int. Cl.
H02M 5/42    (2006.01)
H02M 7/04    (2006.01)
H02M 7/68    (2006.01)

(52) U.S. Cl. .................... 363/89; 363/21.02; 363/97
(58) Field of Classification Search .............. 363/21.02, 363/89, 95, 97
See application file for complete search history.

(56) References Cited

U.S. PATENT DOCUMENTS

| 5,134,355 | A | * | 7/1992 | Hastings ...................... 323/211 |
| 5,410,467 | A | | 4/1995 | Smith et al. |
| 5,424,933 | A | * | 6/1995 | Illingworth .............. 363/21.02 |
| 5,450,305 | A | * | 9/1995 | Boys et al. .................... 363/24 |
| 5,477,131 | A | | 12/1995 | Gegner |
| 5,610,804 | A | * | 3/1997 | Shimizu .................. 363/21.16 |
| 5,771,160 | A | * | 6/1998 | Seong .......................... 363/20 |
| 5,793,621 | A | * | 8/1998 | Yamada ...................... 315/411 |
| 5,835,365 | A | * | 11/1998 | Lee .............................. 363/49 |
| 5,880,943 | A | * | 3/1999 | Yokoyama ............... 363/21.02 |
| 5,991,167 | A | * | 11/1999 | Van Lerberghe ............. 363/16 |
| 6,069,801 | A | * | 5/2000 | Hodge et al. ............. 363/21.02 |
| 6,137,698 | A | * | 10/2000 | Yukawa et al. ................ 363/25 |
| 6,160,374 | A | * | 12/2000 | Hayes et al. ................. 320/108 |
| 6,191,965 | B1 | * | 2/2001 | Matsumoto .................. 363/89 |
| 6,320,765 | B2 | * | 11/2001 | Yasumura ................ 363/21.02 |
| 6,341,075 | B2 | * | 1/2002 | Yasumura ................ 363/21.02 |
| 6,456,509 | B1 | * | 9/2002 | Yasumura ................ 363/21.02 |

(Continued)

FOREIGN PATENT DOCUMENTS

EP    0 504 094 A2    9/1992

(Continued)

*Primary Examiner*—Akm E Ullah
*Assistant Examiner*—Arun Williams
(74) *Attorney, Agent, or Firm*—Antonelli, Terry, Stout & Kraus, LLP.

(57) ABSTRACT

A soft switching DC-DC converter is provided which includes circuitry for both a buck converter and a boost converter. The buck converter circuitry and the boost converter circuitry share a common transformer including a primary coil and first and second secondary coils. A first switching element is coupled to a first capacitor to provide the buck converter operation while another switching element is provided to provide the boost converting operation. The primary coil of the transformer is commonly used as a choke coil by both the buck converter and the boost converter. In this way, size and cost reduction can be obtained.

1 Claim, 10 Drawing Sheets

U.S. PATENT DOCUMENTS

| | | | |
|---|---|---|---|
| 6,466,460 B1 * | 10/2002 | Rein et al. | 363/21.02 |
| 6,469,476 B1 * | 10/2002 | Barrett et al. | 322/29 |
| 6,580,624 B2 * | 6/2003 | Arai | 363/95 |
| 6,600,670 B2 * | 7/2003 | Morita et al. | 363/89 |
| 6,834,002 B2 * | 12/2004 | Yang | 363/89 |
| 6,842,353 B2 * | 1/2005 | Yamada et al. | 363/89 |
| RE39,060 E * | 4/2006 | Okui et al. | 363/45 |
| 2003/0107906 A1 * | 6/2003 | Tokunaga et al. | 363/89 |
| 2003/0142514 A1 * | 7/2003 | Hosotani et al. | 363/21.02 |
| 2004/0130915 A1 * | 7/2004 | Baarman | 363/21.02 |
| 2004/0227496 A1 | 11/2004 | Hosotani et al. | |
| 2005/0109748 A1 * | 5/2005 | Albrecht et al. | 219/130.1 |

FOREIGN PATENT DOCUMENTS

| | | |
|---|---|---|
| EP | 0 726 642 A1 | 8/1996 |
| JP | 2004-129393 | 4/2004 |

* cited by examiner

SOFT SWITCHING DC-DC CONVERTER INCLUDING A BUCK CONVERTER AND A BOOST CONVERTER SHARING A COMMON TRANSFORMER

CLAIM OF PRIORITY

The present application claims priority from Japanese application serial no. 2005-031216, filed on Feb. 8, 2005, the content of which is hereby incorporated by reference into this application.

FIELD OF THE INVENTION

The present invention relates to a soft switching DC-DC converter for converting a voltage of an input power into another voltage.

BACKGROUND OF THE INVENTION

A soft switching DC-DC converter for converting a voltage of an input power into a desired voltage to output can be highly improved in its efficiency by reducing switching loss with soft switching technology. Accordingly, it makes it possible to downsize the passive components such as a choke coil and a capacitor by making the drive frequency of a switching element higher. Thus, as an example of a conventional soft switching DC-DC converter, there is a soft switching DC-DC converter disclosed in Japanese Patent Laid-open No. 2004-129393.

This Patent Document 1 includes an auxiliary resonant circuit in which two serially-connected main switches and a resonant reactor and an auxiliary switch are serially connected to each other. The main switches are alternately turned on/off, and when a first switch which is either of the two main switches is on, electric energy from a DC power source connected to a terminal in the input side is accumulated in a smoothing reactor, and a second switch which is the other of the two main switches is on, the electric energy accumulated in the smoothing reactor is discharged to a load connected to a terminal in the output side. Further, both or either of the main switches include(s) the capacitance(s) to supply the electric energy to the resonant reactor from the output side when the auxiliary switch is on, thereby to use the electric energy for the resonant action of the capacitance(s) and the resonant reactor.

SUMMARY OF THE INVENTION

The circuit disclosed in Patent Document 1, however, requires the resonant reactor and the auxiliary resonant circuit composed of an auxiliary switch and a diode for preventing reverse conduction, causing the size and cost increase of the circuit. In addition, as electric current flows to the auxiliary resonant circuit of the auxiliary switch and diode that are serially connected, there has been concern that the occurrence of losses in the auxiliary switch and the diode could lead to the lowering of efficiency. Further, as it requires a circuit for controlling the auxiliary switch and a power source circuit, there has been a problem of the circuit size increase.

To solve the above problems, the present invention comprises a soft switching DC-DC converter for converting an input voltage into another voltage, the converter including a resonant circuit, wherein a rectification circuit is connected to a power source, a first terminal of the rectification circuit is connected with a first terminal of a first switching element having a control terminal for controlling a main electric current, a second terminal of the first switching element is connected with a first terminal of a primary coil of a transformer having primary and secondary coils, a second terminal of the primary coil of the transformer is connected to a second terminal of the rectification circuit, the second terminal of the first switching element and a first terminal of a first diode are connected together, a second terminal of the first diode is connected with a first terminal of a first capacitor, a second terminal of the first capacitor and the second terminal of the rectification circuit are connected together, a second diode and a second capacitor are connected in parallel to the first switching element, the first terminal of the first switching element and a first terminal of a third diode are connected together, a second terminal of the third diode is connected with a first terminal of a second switching element having a control terminal for controlling the main electric current, a second terminal of the second switching element and a first terminal of the secondary coil of the transformer are connected together, and a second terminal of the secondary coil of the transformer and the second terminal of the first switching element are connected together.

To solve the above problems, the invention comprises a soft switching DC-DC converter for converting an input voltage into another voltage, the converter including a resonant circuit, wherein a rectification circuit is connected to a power source, a first terminal of the rectification circuit is connected with a first terminal of a first switching element having a control terminal for controlling a main electric current, a second terminal of the first switching element is connected with a first terminal of a primary coil of a transformer having primary and secondary coils, a second terminal of the primary coil of the transformer is connected to a first terminal of a first capacitor, the second terminal of the first switching element and a first terminal of a first diode are connected together, a second terminal of the first diode is connected with a second terminal of the rectification circuit, a second terminal of the first capacitor and the second terminal of the rectification circuit are connected together, a second diode and a second capacitor are connected in parallel to the first switching element, the first terminal of the first switching element and a first terminal of a third diode are connected together, a second terminal of the third diode is connected with a first terminal of a second switching element having a control terminal for controlling the main electric current, a second terminal of the second switching element and a first terminal of the secondary coil of the transformer are connected together, and a second terminal of the secondary coil of the transformer and the second terminal of the first switching element are connected together.

To solve the above problems, the invention comprises a soft switching DC-DC converter for converting an input voltage another voltage, the converter including a resonant circuit, wherein a first terminal of a rectification circuit connected to a power source is connected with a first terminal of a primary coil of a transformer having primary and secondary coils, a second terminal of the primary coil of the transformer is connected with a first terminal of a first switching element having a control terminal for controlling a main electric current, a second terminal of the first switching element and a second terminal of the rectification circuit are connected together, the first terminal of the first switching element and a first terminal of a first diode are connected together, a second terminal of the first diode and a first terminal of a first capacitor are connected together, a second terminal of the first capacitor and a second terminal of the rectification are connected together, a second diode and a second capacitor are connected in parallel to the first switching element, the first terminal of the first switching element and a first terminal of the secondary coil of the transformer are connected together, a second terminal of the secondary coil of the transformer and a first terminal of a third diode are connected together, a second terminal of the third diode is connected with a first terminal of a second switching element having a control terminal for controlling the main electric current, the second terminal of the second switching element is connected to the second terminal of the rectification circuit.

Further, the invention comprises a soft switching DC-DC converter for converting an input voltage into another voltage, the converter having a capacitor of the above described boost converter as a power source and being connected with the above described buck converter, wherein the boost converter is connected with the resonant circuit, and the buck converter is connected with the resonant circuit.

Further, the invention comprises a soft switching DC-DC converter for converting an input voltage into another voltage, the converter having a capacitor of the above described buck type DC-DC converter as a power source and being connected with the above described boost converter, wherein the buck converter is connected with the resonant circuit, the boost converter is connected with the resonant circuit, and the primary coil of the transformer in the resonant circuit of the buck converter is commonly used as a choke coil for the boost converter and the buck converter.

Further, the invention comprises a soft switching DC-DC converter for converting an input voltage into another voltage, the converter including a control circuit, wherein a rectification circuit is connected to a power source, a first terminal of the rectification circuit and a first terminal of an inductor are connected together, a second terminal of the inductor and a first terminal of a first switching element having a control terminal for controlling a main electric current are connected together, a second terminal of the first switching element and a second terminal of the rectification circuit are connected together, the second terminal of the first switching element and a first terminal of a first diode are connected together, the buck converter is connected between a second terminal of the first diode and a second terminal of the rectification circuit, the buck converter is connected with the rectification circuit, wherein, the first switching element is turned on when the voltage is equal to or less than a desired input voltage value, and the first switching element is turned off when the voltage exceeds the desired input voltage value.

Further, the invention comprises a soft switching DC-DC converter using the transformer having primary and secondary coils, wherein the coefficient of coupling between the primary and secondary coils of the transformer is in the range of 0.2 to 0.9.

Further, the invention comprises a soft switching DC-DC converter provided with a period of time in which the first and second switching elements are both turned off, wherein the first switching element is turned on at least after the second switching element has been turned on.

Further, the invention comprises a soft switching DC-DC converter including:

a first drive circuit for driving and controlling a first switching element;

a second drive circuit for driving and controlling a second switching element;

an input voltage detection section for detecting an input voltage;

an input current detection section for detecting an input current;

an output voltage detection section for detecting an output voltage;

an output voltage setting section for setting an output voltage; and a control circuit for controlling these components, wherein the control circuit controls the first drive circuit and the second drive circuit so as to match the shapes of the voltage waveform in the input voltage detection section and the current waveform in the input current detection section, as well as to match the voltage values in the output voltage detection section and the output voltage setting section.

Further, the invention comprises a soft switching DC-DC converter, wherein the first switching element is turned on, when the second switching element has been turned on and when the potential difference between one terminal of the first switching element and the other terminal of the first switching element is 0 V.

Further, the invention comprises a soft switching DC-DC converter, wherein the first switching element is turned on when the second switching element has been turned on and is distributing power to the second diode.

Further, the invention comprises a soft switching DC-DC converter, wherein the transformer having the primary and secondary coils is molded by high thermal conductive resin with a metal or inorganic ceramic filler mixed in a high-thermal conductive resin in which an anisotropic structure exists within the resin component.

Further, the invention comprises a soft switching DC-DC converter using the transformer having the primary and secondary coils, wherein the secondary coil is divided into two or more.

Further, the invention comprises a soft switching DC-DC converter, wherein the second switching element uses a switching element with a reverse voltage.

To solve the above problems, the invention comprises a soft switching DC-DC converter for converting an input voltage into another voltage, the converter including:

a first switching element having a first terminal connected to the input side and having a control terminal for controlling a main electric current of the soft switching DC-DC converter;

a primary coil of a transformer having primary and secondary coils, connected to a second terminal of the first switching element;

a diode having a first terminal connected to a first terminal side of the first switching element;

a second switching element having a first terminal connected to a second terminal of the diode; and the secondary coil of the transformer, having a first terminal connected to a second terminal of the second switching element, and a second terminal connected to the second terminal of the first switching element.

To solve the above problems, the invention comprises a soft switching DC-DC converter for converting an input voltage into another voltage, the converter including:

a first switching element having a first terminal connected to the input side and having a control terminal for controlling a main electric current toward the DC-DC converter;

a first diode having a first terminal connected to a second terminal of the first switching element;

a primary coil of a transformer having primary and secondary coils, connected to the second terminal of the first switching element;

a second diode having a first terminal connected to a first terminal side of the first switching element;

a second switching element having a first terminal connected to a second terminal of a second diode; and a secondary coil of the transformer, having a first terminal connected to a second terminal of the second switching element, and a second terminal connected to the second terminal of the first switching element.

To solve the above problems, the invention comprises a soft switching DC-DC converter for converting an input voltage into another voltage, the converter including:

a first switching element having a control terminal for controlling a main electric current of the soft switching DC-DC converter;

a primary coil of a transformer having primary and secondary coils, connected to a first terminal of the first switching element;

the secondary coil of the transformer, connected to the first terminal of the first switching element;

a diode having a first terminal connected to the other terminal of the secondary coil of the transformer; and a second switching element having a first terminal connected to a second terminal of the diode, wherein a second terminal of the second switching element is connected to a second terminal of the first switching element.

Further, the invention comprises a soft switching DC-DC converter provided with a period of time in which both of the first and second switching elements are turned off, wherein the first switching element is turned on at least after the second switching element has been turned on.

Further, the invention comprises a soft switching DC-DC converter, wherein the first switching element is turned on, when the second switching element has been turned on and when the potential difference between one terminal of the first switching element and the other terminal of the first switching element is 0 V.

Further, the invention comprises a soft switching DC-DC converter, wherein the first switching element is turned on when the second switching element has been turned on and is distributing power to the second diode.

The soft switching DC-DC converter according to the invention allows a substantial reduction of the loss in the capacitor operation, by including a resonant circuit composed of a transformer.

Further, the switching loss can be substantially reduced and a high frequency operation is possible, thereby allowing the size and cost reductions of the transformer and capacitor.

DESCRIPTION OF THE PREFERRED EMBODIMENTS

Embodiment 1

First of all, a first embodiment of the present invention will be described with reference to FIGS. 1 and 2.

Figure 1:
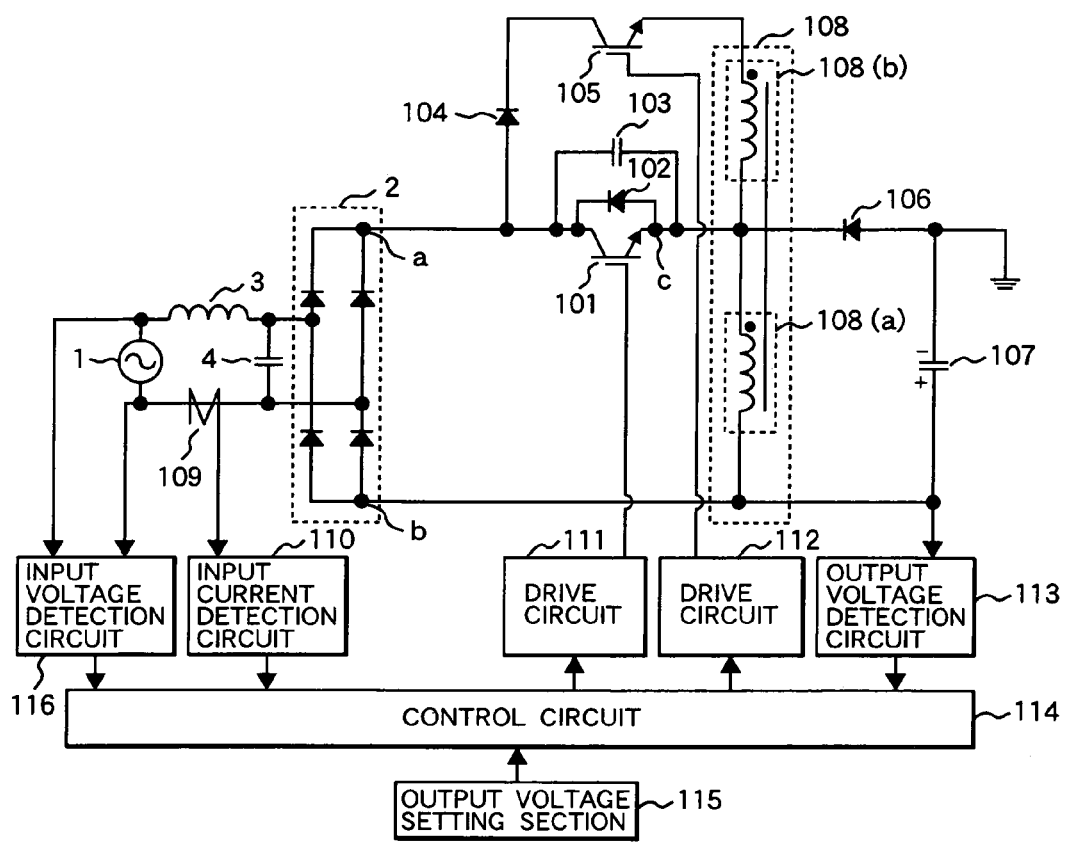
FIG. 1 is a circuit view showing the configuration of a buck-boost converter of a first embodiment according to the invention.
Figure 2:
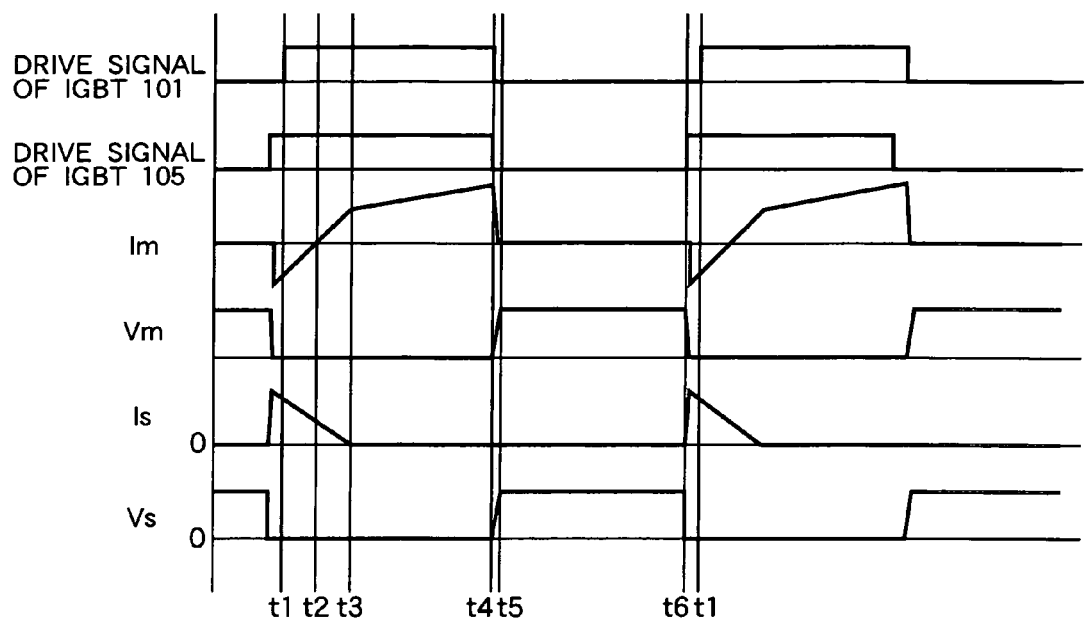
FIG. 2 is a time chart showing the operation of FIG. 1.

FIG. 1 is a circuit view of a soft switching DC-DC converter which is the first embodiment of the invention. This embodiment is a buck-boost converter allowing both the boost operation of outputting a voltage higher than the input voltage and the buck operation of outputting a voltage lower than the input voltage.

The configuration of FIG. 1 is described as follows: a commercial AC power source 1 is applied to a rectification circuit 2, full wave rectified, and converted into a DC current via a filter circuit composed of an inductor 3 with a coil and a capacitor 4. Herein, assuming the high potential side of the rectification circuit 2 is a point and the low potential side is b point, a point is connected with a collector terminal of an IGBT 101 as a main switching element, and the cathode and anode of a diode 102 are connected between the collector and emitter of the IGBT 101. Further, a snubber capacitor 103 is connected in parallel to the IGBT 101. Connected to a point is an anode terminal of a diode 104, and connected to a cathode terminal of the diode 104 is a collector terminal of an IGBT 105 as an auxiliary switching element. Assuming the emitter terminal of the IGBT 101 is c point, a primary coil 108a of a transformer 108 is connected between c point and b point, and a secondary coil 108b of the transformer 108 is connected between the emitter terminal of the IGBT 105 and c point. Connected to c point is a cathode of a diode 106 and an anode terminal of the diode 106 is connected to a ground. A capacitor 107 is connected between b point and the ground. A voltage of the commercial AC power source 1 is input to an input voltage detection circuit 116, and an input current detection element 109 detects the input voltage of the commercial AC power source 1 which is then connected to an input current detection circuit 110, and the output voltage at b point is input to an output voltage detection circuit 113. The outputs of the input current detection circuit 110, the output voltage detection circuit 113, and an output voltage setting section 115 are input to a control circuit 114, and drive circuits 111, 112 are connected to the gate terminals of the IGBTs 101, 105 respectively from the control circuit 114.

Next, the operations will be described. First of all, the description will be made when the IGBTs 101, 105 are in the turn-off state. The outputs of the drive circuits 111, 112 are 0 V, so that the IGBTs 101, 105 are in the turn-off state and no electric current flows therethrough. At this time, the commercial AC power source 1 is full wave rectified by the rectification circuit 2, and a voltage smoothed by a smoothing circuit of the capacitor 4 is applied to the capacitor 103. Next, the operation from times t1 to t6 will be described. A drive signal is applied to the IGBT 101 at time t1, however, as the electric current is flowing to the loop of the diode 104, the IGBT 105, the transformer 108b and the diode 102 due to the energy accumulated in the transformer 108b, so that the electric current does not flow to the IGBT 101. In other words, when the IGBT 101 is turned on during a period of time the electric current is flowing to the diode 102, a zero voltage switching (hereinafter referred to as ZVS) and a zero current switching (hereinafter referred to as ZCS) are enabled, so that the switching loss will not occur. Next, the current begins to flow to the IGBT 101 at time t2, and the current flowing to the diode 104, the IGBT 105, the transformer 108b and the capacitor 4 gradually decreases and stops flowing at time t3. When the IGBTs 101, 105 are turned off at time t4, the current to the IGBT 101 is broken, and the current flows to the snubber capacitor 103 from time t4 to time t5, and then the voltage between the collector and emitter of the IGBT 101 increases by the dv/dt that is determined by the capacity of the snubber capacitor 103 and the breaking current value. In other words, moderating the dv/dt of the voltage between the collector and emitter of the IGBT 101 by the snubber capacitor 103 enables ZVS, so that the turn-off loss can be reduced. While no current flows through the IGBT 105, so that the turn-off loss will not occur. When the IGBT 105 is turned on at time t6, the current flows to the loop of the diode 104, the IGBT 105, the transformer 108b and the snubber capacitor 103, and the charge charged in the snubber capacitor 103 is pulled out. At this time, the inclination di/dt of the current at the turn-on is moderated to be the ZCS condition by leakage inductance of the transformer 108b, so that the turn-off loss can be reduced. Herein, assuming the time difference from t6 to t1 is Δt, the IGBT 105 is turned on earlier than the IBGT 101 by Δt to pull out the charge of the snubber capacitor 103, thereby the inrush current flowing to the IGBT 101 is suppressed. The optimum value of this Δt is the most effective with the IGBT 101 tuned on at the moment when the voltage between the collector and emitter of the IGBT 101 is 0 V.

Figure 3:
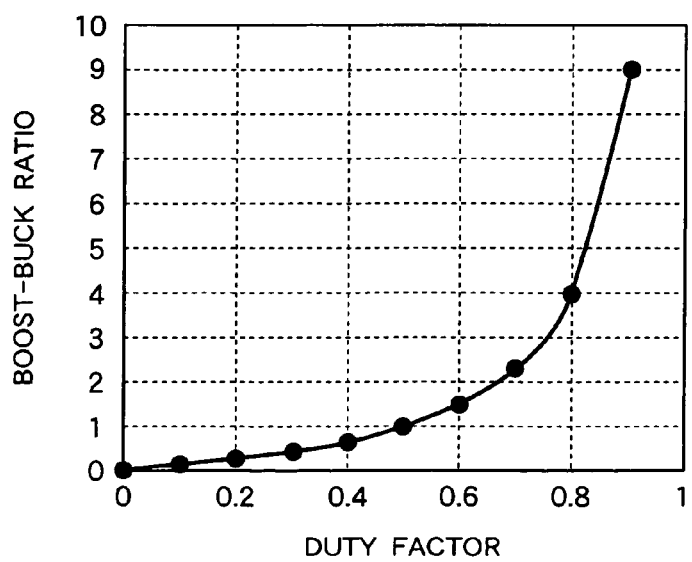
FIG. 3 is a view illustrating the operation of FIG. 1.

Next, FIG. 3 shows the relation between the duty factor and buck-boost ratio of the IGBT 101. Herein, the ratio between the input voltage and the output voltage is called as the buck-boost ratio. If the buck-boost ratio is less than one, it is the buck operation, and if larger than one, it is the boost operation. As shown in FIG. 3, the buck-boost ratio is one when the duty factor of the IGBT 101 is 50%, and the buck operation is possible by making the duty factor less than 50%, while the boost operation is possible by making the duty factor larger that 50%.

Next, the operation of the control circuit will be described. The input voltage detection circuit 116 detects the voltage of the commercial AC power source 1, and the detected voltage is input to the control circuit 114. The input current detection element 109 detects the electric current input from the commercial AC power source 1, and the input current detection circuit 110 converts the output signal level of the input current detection element 109 into a signal appropriate for the input level of the control circuit 114. The output voltage setting section 115, which is an interface for a user to set up the output voltage, sends the signal to the control circuit 114 according to the established output.

The control circuit 114 controls the drive timings of the drive circuits 111, 112 according to the input current, the output voltage, and the output signal from the output voltage setting section 115. The drive timing is controlled to be a sign wave by the input current detection element and also controlled to be a desired output voltage value. With such a control, the power factor becomes about 100%, thereby allowing the suppression of harmonics. The diode 104 may be omitted as long as the IGBT 105 is a reverse blocking type. The similar effect can be obtained when the current detection element 109 detects the current flowing to the primary coil of the transformer 108.

As described above, the embodiment is provided with the auxiliary resonant circuit composed of the IGBTs, the diodes, the snubber capacitor and the transformer, thereby enabling the ZVS/ZCS turn-on and ZVS turn-off, and allowing a substantial reduction in losses. The switching loss can be substantially reduced, so that the high frequency operation is possible, allowing the size and cost reductions in the transformer and capacitor. Further, it is possible to output from buck to boost by controlling the duty factor of the IGBT 101.

Embodiment 2

Figure 4:
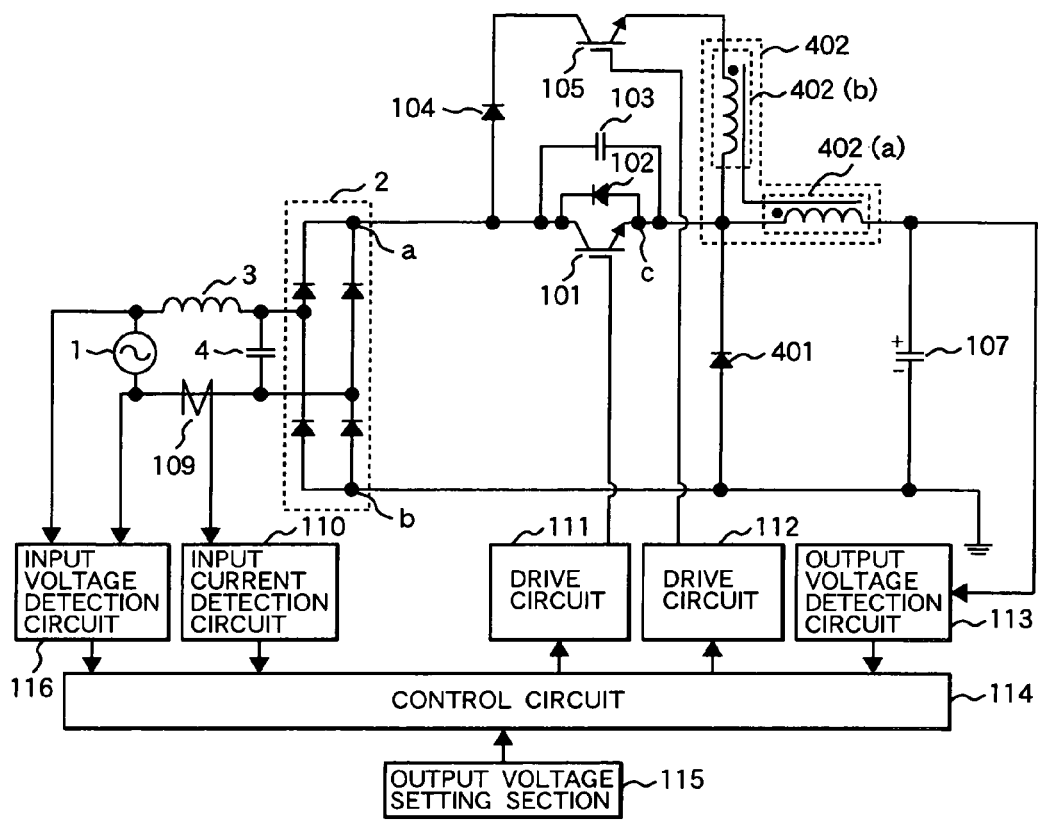
FIG. 4 is a circuit view showing the configuration of a buck converter of a second embodiment according to the invention.

FIG. 4 is a circuit view showing a second embodiment of the invention. This embodiment is a buck-type soft switching DC-DC converter. In FIG. 4, the same reference numerals are assigned to the same components as those in FIGS. 1 to 3.

The configuration of FIG. 4 will be described. In FIG. 4, the embodiment differs from embodiment 1 at the point where a cathode terminal of a diode 401 is connected to c point and an anode terminal of the diode 401 is connected to b point, and a primary coil 402a of a loose coupling transformer 402 is connected to c point and the positive electrode side of an output capacitor 107.

Next, the operations will be described. The operation when the IGBTs 101, 105 are in the turn-off state is the same as that in the first embodiment. When the IGBT 101 is turned on, the electric current flows to the IGBT 101, the transformer 402a, the capacitor 107 and the capacitor 4, as well as to the commercial AC power source 1, the rectification circuit 2, the inductor 3, the IGBT 101, the transformer 402a and the capacitor 107. When the IGBTs 101, 105 are tuned off at a predetermined timing, the current flows to the transformer 402a, the capacitor 107 and the diode 401 by the energy accumulated in the transformer 402a, as well as the current flows to the commercial AC power source 1, the rectification circuit 2, the inductor 3, the snubber capacitor 103, the transformer 402a and the capacitor 107, thereby the snubber capacitor 103 charges. Because of the snubber capacitor 103 charging, the dv/dt of the voltage between the collector and emitter of the IGBT 101 is reduced to realize ZVS, allowing the reduction of the turn-off loss. Next, when the IGBT 105 is turned on, the charge charged in the snubber capacitor 103 is discharged through the diode 104, the IGBT 105, the transformer 402b and the snubber capacitor 103. At this time, the inclination di/dt of the flowing current is modified to become the ZCS condition by the leakage inductance of the transformer 402b, so that the turn-on loss can be reduced. Next, the IGBT 101 is turned on after the snubber capacitor 103 has been discharged, that is the IGBT 101 can be turned on at 0 V of the voltage between the collector and the emitter of the IGBT 101, the ZVS (Zero Voltage Switching) is achieved, thereby the turn-on loss in the IGBT 101 will not occur. By repeating the above operations, the input voltage can be converted into a desired bucked voltage and output.

Figure 5:
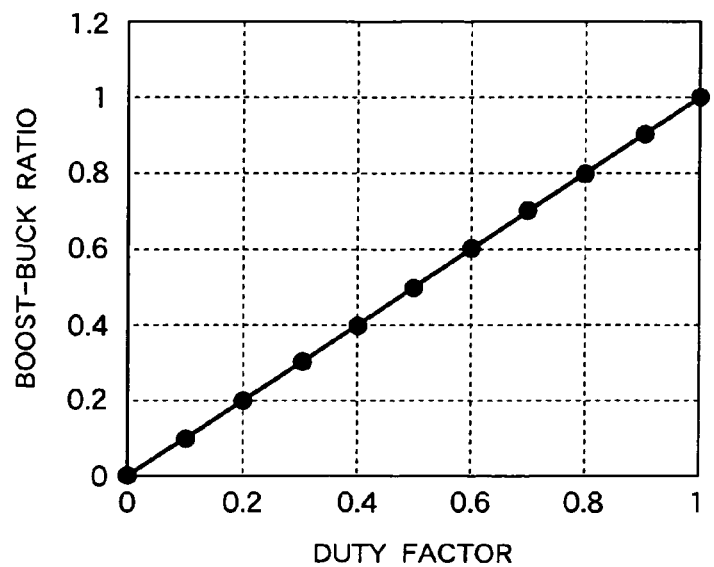
FIG. 5 is a view illustrating the operation of FIG. 4.

Next, FIG. 5 shows the relation between the duty factor and buck-boost ratio of the IGBT 101. As shown in FIG. 5, the buck-boost ratio is one at the duty factor of 100%, and the buck-boost ratio becomes smaller as the duty factor is shortened. Thus, a highly accurate buck-boost operation is possible by controlling the duty factor of the IGBT 101. Further, the diode 104 may be omitted as long as the IGBT 105 is a reverse blocking type.

As described above, the embodiment is provided with the auxiliary resonant circuit composed of the IGBTs, the diodes, the snubber capacitor, and the transformer, thereby enabling the ZVS/ZCS turn-on and ZVS turn-off, and allowing a substantial reduction in losses. The switching loss can be substantially reduced, so that the high frequency operation is possible, allowing the size and cost reductions in the transformer and capacitor. Further, a highly accurate buck-boost operation is possible by controlling the duty factor of the IGBT 101.

Embodiment 3

Figure 6:
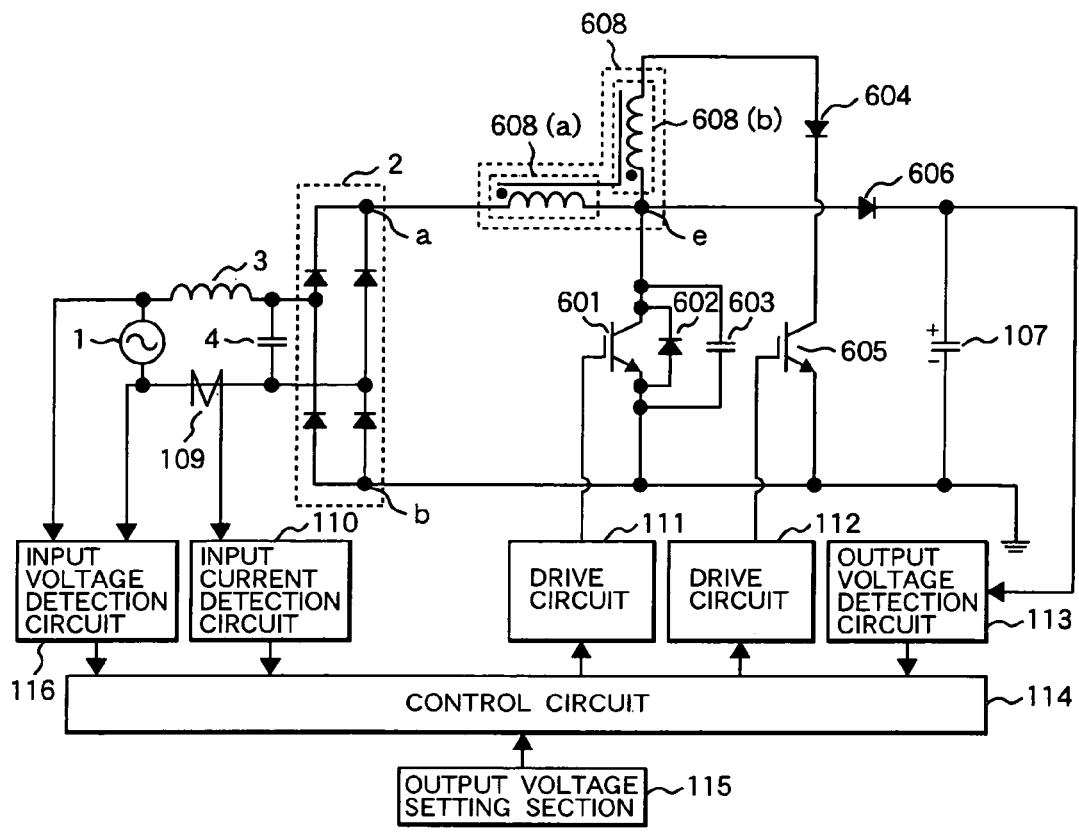
FIG. 6 is a circuit view showing the configuration of a boost converter of a third embodiment according to the invention.

FIG. 6 is a circuit view showing a third embodiment of the invention. This embodiment is a boost-type soft switching DC-DC converter. In FIG. 6, the same reference numerals are assigned to the same components as those in FIGS. 1 to 5.

The configuration of FIG. 6 will be described. In FIG. 6, the inductor 3 is connected between a point and d point, the capacitor 4 is connected between d point and b point, a primary coil 608a of a transformer 608 is connected between d point and e point, and an IGBT 601 is connected between d point and b point, wherein a collector terminal of the IGBT 601 is connected to d point and an emitter terminal thereof is connected to b point. Connected to the collector terminal of the IGBT 601 is a cathode terminal of a diode 602, and connected to the emitter terminal of the IGBT 601 is an anode terminal of the diode 602. Further, a snubber capacitor 603 is connected in parallel to the IGBT 601. The anode terminal of the diode 604 is connected from d point via a secondary coil 608b of the transformer 608, and the cathode terminal is connected to the collector terminal of the IGBT 605, the emitter terminal thereof is connected to b point. Further, connected to d point is an anode terminal of a diode 606, and connected to a cathode terminal thereof is the positive electrode terminal of the capacitor 107. The negative electrode of the capacitor 107 is connected to b point.

Next, the operations will be described. The operation when the IGBTs 601, 605 are in the turn-off state is the same as that in the first embodiment. When the IGBT 605 is turned on, the charge charged in the snubber capacitor 603 flows to the diode 604 and the IGBT 605 via the transformer 608b. At this time, the inclination di/dt of the current flowing from the snubber capacitor 603 is modified by the leakage inductance of the transformer 608b to realize ZCS. Because of this feature, the reduction of the turn-on loss is achieved. Next, when the charging voltage of the snubber capacitor is 0 V, the current flows to the loop of the diode 602, the transformer 608a, the diode 604 and the IGBT 605 by the energy accumulated in the transformer 608b. The IGBT 601 is turned on during a period of time the current is flowing to the diode 602. Thus, the IGBT 601 is turned on in the state in which the voltage is not positively applied between the collector and emitter of the IGBT 601, thereby realizing ZVS and ZCS with no turn-off loss occurring. Next, when the energy of the transformer 608b runs out, the current flows from the commercial AC power source 1 to the IGBT 601 via the rectification circuit 2, the inductor 3, and the transformer 608a, as well as from the capacitor 4 to the transformer 608a and the IGBT 601. Next, the IGBTs 601, 605 are turned off at a desired timing, and then the current flows to the snubber capacitor 603 to charge. At this time, as the snubber capacitor moderately charges by the charging time dv/dt that is determined by the breaking current and the capacity of the snubber capacitor 603, ZVS can be realized and the turn-off loss in the IGBT can be reduced. The current flows to the diode 606, the capacitor 107 and the capacitor 4 by the energy accumulated in the transformer 608a, as well as the current flows from the commercial AC power source 1 to the rectification circuit 2, the inductor 3, the transformer 608a, the diode 606 and the capacitor 4 to boost the voltages at the both terminals of the capacitor 4.

Figure 7:
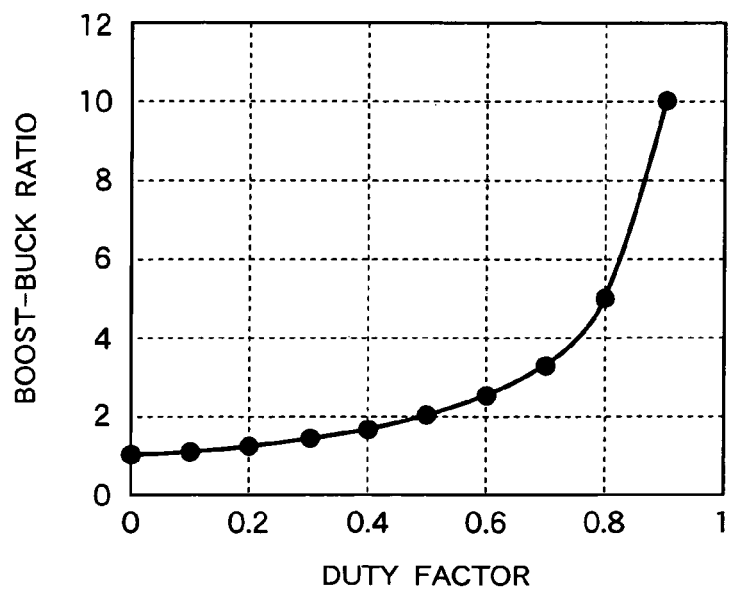
FIG. 7 is a view illustrating the operation of FIG. 6.

FIG. 7 shows the relation between the duty factor and boost-back ratio of the IGBT 601. When the duty factor of the IGBT 601 becomes zero, or the IGBT 601 is in the turn-off state, the voltage of the capacitor 4 is output to the capacitor 607, and the buck-boost ratio is one. As shown in FIG. 7, the buck-boost ratio grows as the duty factor increases. The diode 604 may be omitted as long as the IGBT 605 is the reverse blocking type.

As described above, the embodiment is provided with the auxiliary resonant circuit composed of the IGBT, the diode, the snubber capacitor, and the transformer, thereby enabling the ZVS/ZCS turn-on and ZVS turn-off, and allowing a substantial reduction in losses. The switching loss can be substantially reduced, so that the high frequency operation is possible, allowing the size and cost reductions in the transformer and capacitor. Further, a highly accurate buck-boost operation is possible by controlling the duty factor of the IGBT 601.

Embodiment 4

Figure 8:
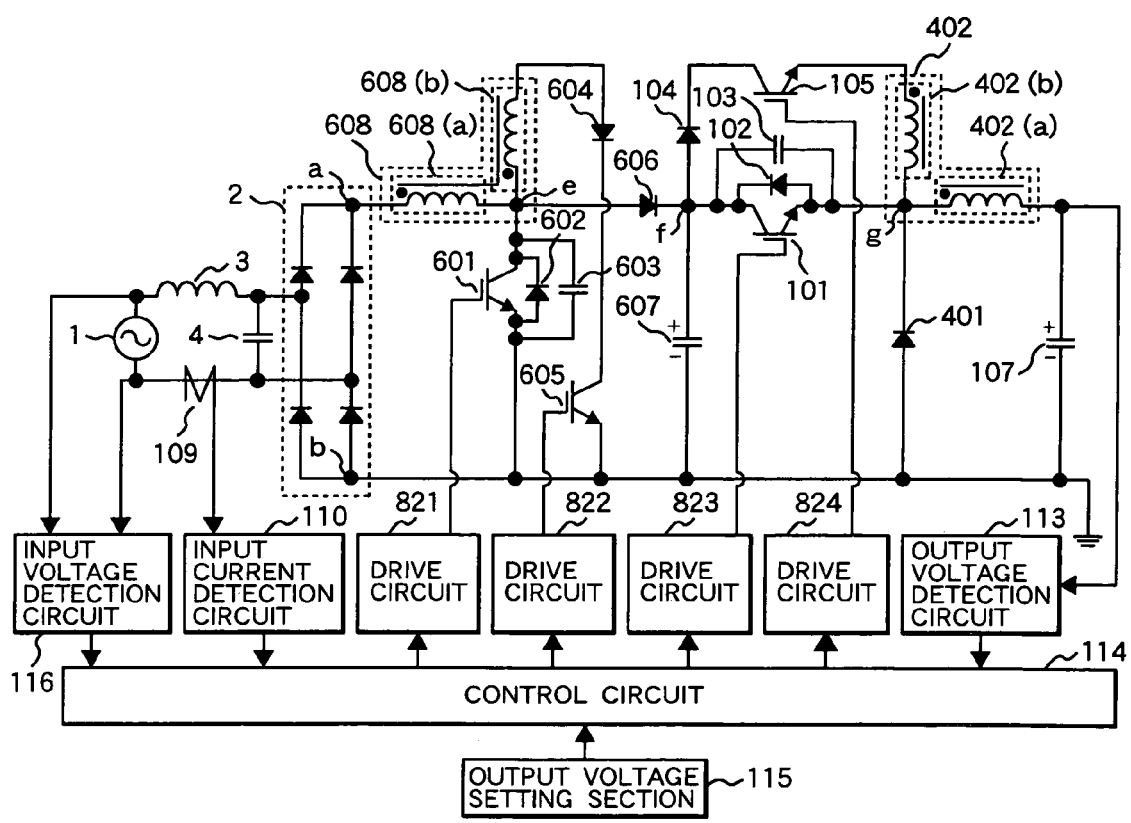
FIG. 8 is a circuit view showing the configuration of a buck-boost converter of a fourth embodiment according to the invention.

FIG. 8 is a circuit view showing a fourth embodiment of the invention. This embodiment is a buck-boost type of soft switching DC-DC converter. In FIG. 8, the same reference numerals are assigned to the same components as those in FIGS. 1 to 7.

The configuration of FIG. 8 will be described. In FIG. 8, the configuration is made such that the same circuit as that in the above described embodiment 3 is connected to a point and b point, and the same circuit as that in the above described embodiment 2 is connected to e point and b point.

Next, the operation will be described. The voltage generated in the capacitor 607 performs the boost operation similarly in the above described embodiment 3. Further, the voltage generated in the capacitor 107 having the capacitor 607 as the power source performs the buck operation similarly in the above described embodiment 2. The relation between the duty factor and buck-boost ratio of the IGBT 601 is the same as that in FIG. 7, and the relation between the duty factor and buck-boost ratio of the IGBT 101 is the same as that in FIG. 5.

As described above, the embodiment allows the buck-boost operation in combination of the two circuits of the boost circuit and the buck circuit. Further, as the boost operation and the buck operation can be independently controlled, allowing specific setting of the output voltage, so that the buck and boost operations can be realized with higher accuracy. In addition, soft switching makes it possible to reduce the switching loss, allowing the high frequency operation. Because of this feature, the size of the passive components such as the transformer and capacitor can be reduced, so that the size and cost reduction in the entire system can be realized.

Embodiment 5

Figure 9:
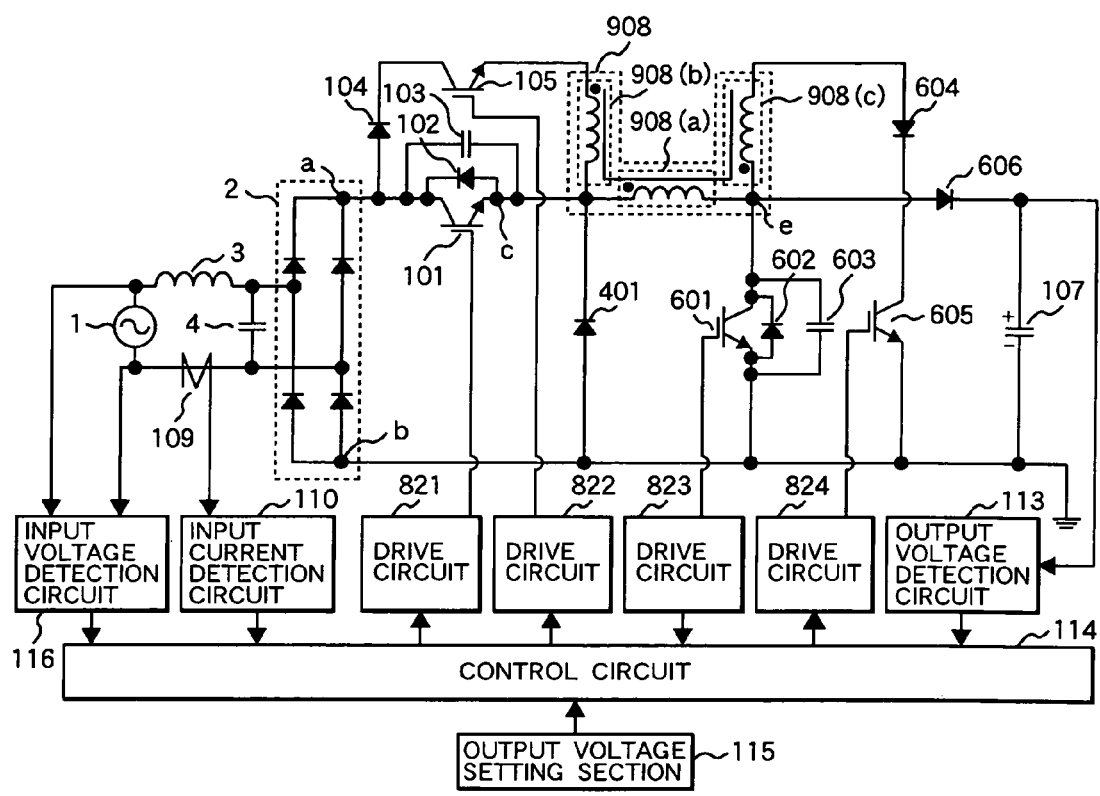
FIG. 9 is a circuit view showing the configuration of a buck-boost converter of a fifth embodiment according to the invention.

FIG. 9 is a circuit view showing a fifth embodiment of the invention. This embodiment is a buck-boost type of soft switching DC-DC converter. In FIG. 9, the same reference numerals are assigned to the same components as those in FIGS. 1 to 8.

The configuration of FIG. 9 will be described. In FIG. 9, the same circuit as that in the above described embodiment 2 is connected to a point and b point, and the same circuit as that in the above described embodiment 3 is connected to d point and b point. A transformer 908 is composed of a primary coil 908a and two secondary coils 908b, 908c, wherein the transformer 908b is connected to c point and the transformer 908c is connected to d point.

Next, the operations will be described. The operation when the IGBTs 101, 605 are in the turn-off state is the same as that in the first embodiment. First of all, the buck operation will be described. The electric current flows to the path of the diode 104, the IGBT 105, the transformer 908b, and the diode 102 at the timing when the IGBT 101 is tuned on, so that no current flows to the IGBT 101. Thus, the so-called ZVS/ZCS turn-on is realized. Next, when the energy in the transformer 908b is consumed, the current flows to the path of the IGBT 101, the transformer 908a, the diode 606, the capacitor 107, and the capacitor 4. Next, when the IGBTs 101, 105 are turned off at a desired timing, the charging current flows to the snubber capacitor 103, and the voltage between the collector and emitter of the IGBT 101 moderately increases by dv/dt that is determined by the capacity of the snubber capacitor 103 and the breaking current of the IGBT 101. With this moderate dv/dt, ZVS can be realized and the turn-off loss can be reduced. Next, the current flows to the path of the diode 606, the capacitor 107, and the diode 401 with the energy of the transformer 908a. By repeating the above operations, the buck-boost operation is achieved.

Next the boost operation will be described. For the boost operation, the IGBT 101 is required to be always in the turn-on state. The IGBT 105 is in the turn-off state. At the timing of the IGBT 601 turned on, the electric current is flowing to the path of the transformer 908c, the diode 604, the IGBT 605 and the diode 602, so that no current flows to the IGBT 601. Thus, the so-called ZVS/ZVS turn-on is achieved. Next, the energy of the transformer 908c is consumed, and the current flows to the path of the IGBT 101, the transformer 908a, the IGBT 601, and the capacitor 4 to accumulate energy in the transformer 908a. Next, the IGBTs 601, 605 are turned off at a desired timing, the charging current flows to the snubber capacitor 603, and the voltage between the collector and emitter of the IGBT 601 moderately increases by dv/dt that is determined by the capacity of the snubber capacitor 103 and the breaking current of the IGBT 601. With this moderate dv/dt, ZVS can be realized and the turn-off loss can be reduced. Next, with the energy of the transformer 908a, the current flows to the path of the diode 606, the capacitor 107 and the diode 401. By repeating the above operations, the boost operation is achieved.

As described above, the embodiment can make the boost converter choke coil and the buck converter choke coil together as one component, allowing the size reduction in the transformer, and also allowing the size and cost reduction of the system.

Embodiment 6

Figure 10:
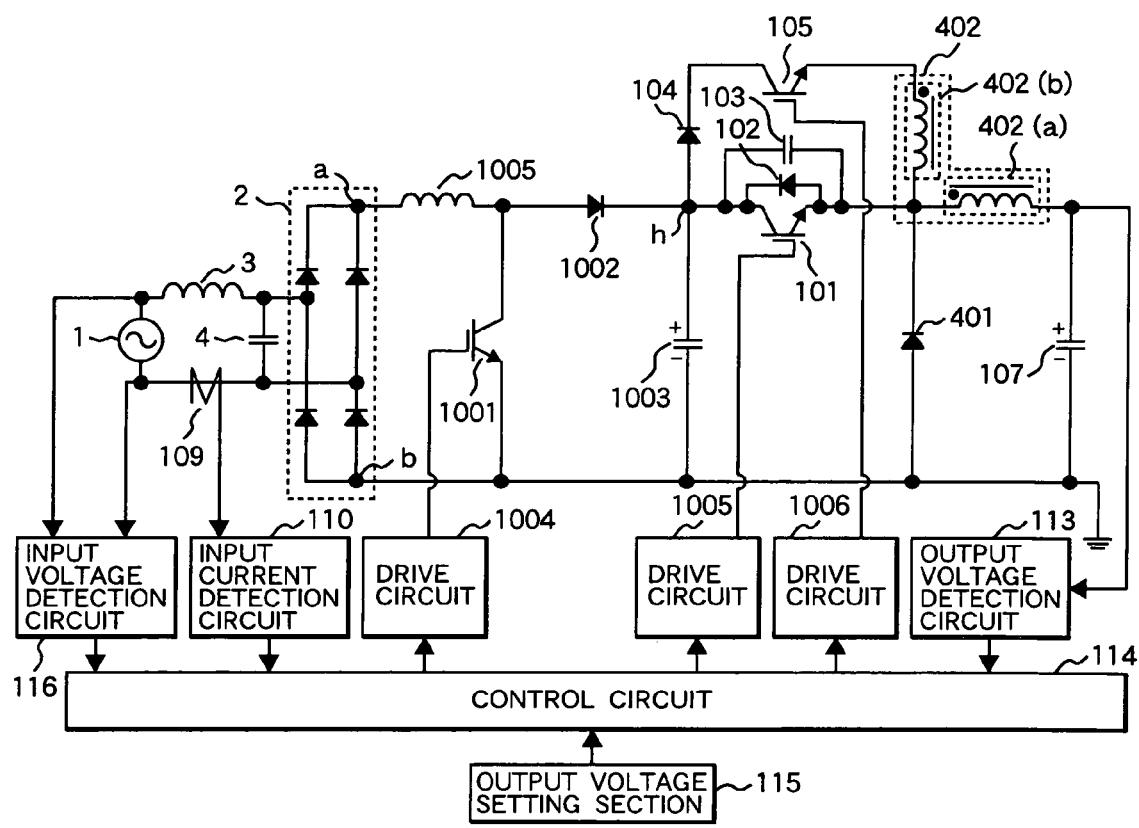
FIG. 10 is circuit view showing the configuration of a buck-boost converter of a sixth embodiment according to the invention.

FIG. 10 is a circuit view showing a sixth embodiment of the present invention. This embodiment is a buck-boost type of soft switching DC-DC converter. In FIG. 10, the same reference numerals are assigned to the same components as those in FIGS. 1 to 9.

The configuration of FIG. 10 will be described. In FIG. 10, an inductor 1005 is connected from the commercial AC power source 1 via the rectification circuit 2 and the IGBT 1001 is connected between the inductor 1005 and b point. Connected to a collector terminal of the IGBT 1001 is an anode terminal of the diode 1002, and a cathode terminal of the diode 1002 is connected to h point. The configuration is made such that a point and b point in the above described embodiment 2 are connected to h point and b point respectively.

Figure 11:
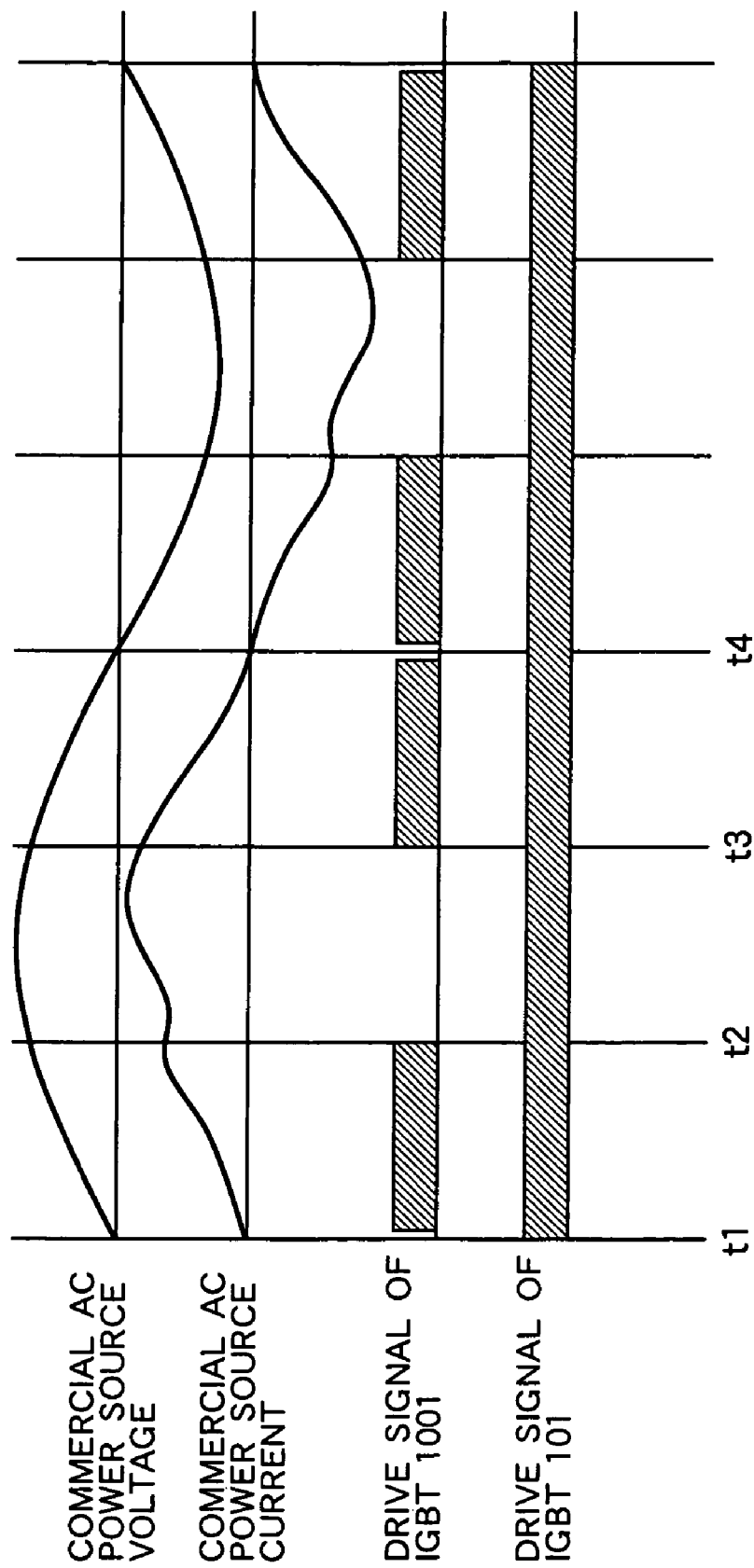
FIG. 11 is a view illustrating the operation of FIG. 10.

Next, the operations will be described with reference to FIG. 11. The switching operation is applied to the IGBT 1001 to flow an input current when the output value of the input voltage detection circuit is a predetermined value or less, and when the output value is a predetermined value or more, the switching operation of the IGBT.1001 is halted to carry out the operation of flowing the current to a capacitor 1003. With such an operation, the conduction period of the IGBT 1001 is made as short as possible, and the IGBT 1001 operates only at a portion in which the input voltage is low, so that the electrical power the IGBT 1001 consumes can be reduced. Thus it makes it possible to improve the power factor with high efficiency. Further, in the case of the buck operation, by carrying out the same operation as that in the above described embodiment 2, the soft switching operation is possible and the switching loss will be reduced.

As described above, the embodiment allows a substantial reduction of the loss in the boost converter, by setting the switching operation of the boost converter to operate or halt due to the input voltage. Further, the soft switching technology can be also applied to the buck converter, providing a lower loss in the buck-boost DC-DC converter, thereby allowing a very high efficiency.

Embodiment 7

Figure 12:
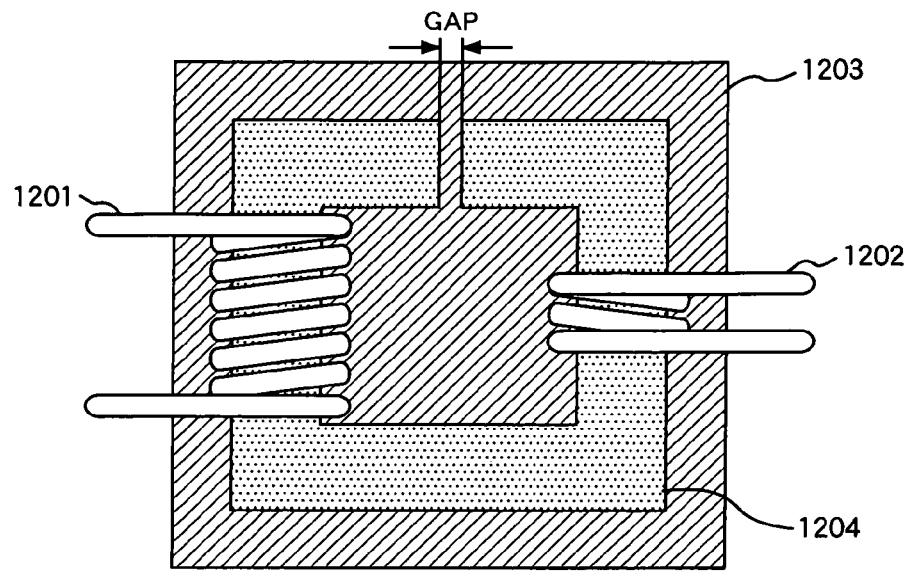
FIG. 12 is a configuration view of a transformer of a seventh embodiment according to the invention.

FIG. 12 is a configuration view of a transformer representing a seventh embodiment.

A transformer 1210 of FIG. 12 has a primary coil 1201, a secondary coil 1202, a high thermal conductive resin 1203, and an iron core 1204. This transformer 1210 includes the primary and secondary coils and the iron core with high relative magnetic permeability and excellent high frequency characteristic. This iron core is provided with a gap to weaken the coefficient of coupling between the primary and secondary coils. The surround and inside of the transformer is cemented with the high thermal conductive resin. The high thermal conductive resin can be made by a method of mixing a metal or inorganic ceramic filler with high-thermal conductance into a resin and other methods.

More specifically, the composition of the high thermal conductive member is desirably a high-resistance member with a thermal conductivity of 5 W/mK or more and a volume resistivity of $10E^6$ Ω/cm or more, and more desirably, an insulating member with a volume resistivity of $10E^{16}$ Ω/cm or more. The high thermal conductive member is desirably a resin having an epoxy resin composition and other compositions, and as a specific example of the material, there may be used a material that can be produced from thermoset, wherein the thermosetting resin composition includes an epoxy resin composition and an inorganic filler (for example, an inorganic ceramic filler), the epoxy resin composition including an epoxy resin monomer having a mesogen, the mesogen content in the epoxy resin composition being 31% by weight or more.

Figure 13:
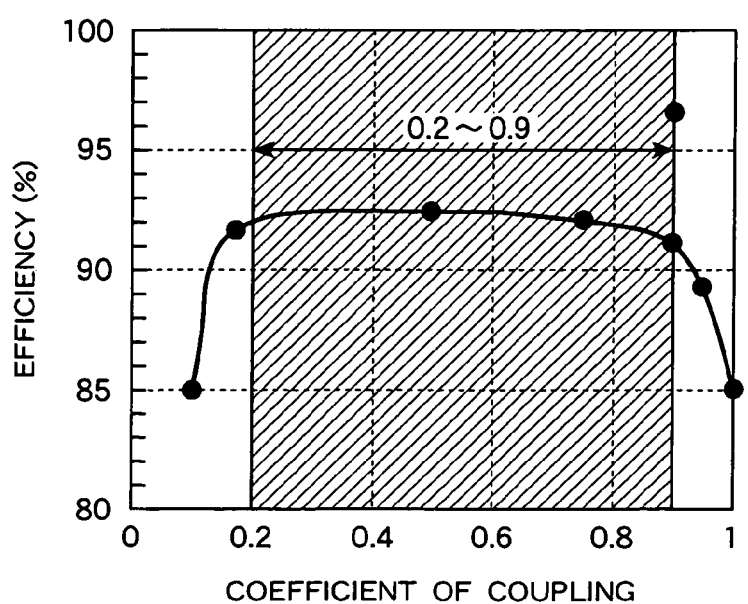
FIG. 13 is a view showing the relation between the coefficient of coupling of the transformer of FIG. 12 and the efficiency of the soft switching DC-DC converter.

FIG. 13 is a graph showing the relation between the coefficient of coupling of the transformer and the exchange efficiency of the soft switching DC-DC converter. From the test result, as shown in FIG. 12, by setting the coefficient of coupling of the transformer to the range of 0.2 to 0.9, the exchange efficiency of over 90% can be achieved.

As described above, the embodiment ensures the exchange efficiency of over 90%, by setting the coefficient of coupling of the loose-coupling transformer covered with the high thermal conductive resin to the range from 0.2 to 0.9. Further, the heat radiation is improved with the high thermal conductive resin, allowing the deletion or size reduction of a cooling system, thereby allowing the size and the cost reduction of the system.

Embodiment 8

Figure 14:
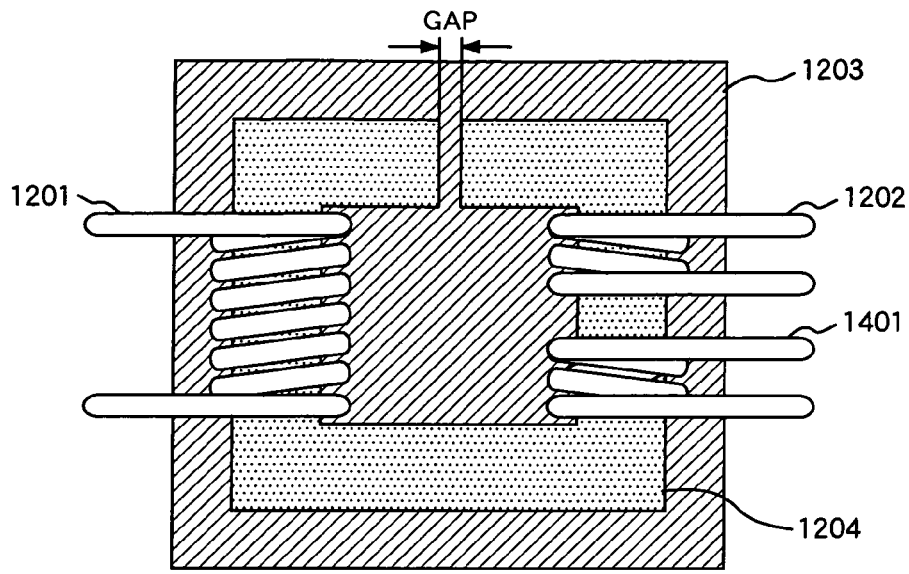
FIG. 14 is a configuration view of a transformer of an eighth embodiment according to the invention.

FIG. 14 is a configuration view of a transformer representing an eighth embodiment of the invention.

The configuration of the transformer of FIG. 14 differs from that of the above described embodiment 7 at the point where the former is provided with two secondary coils. With such a configuration, the transformer used for the circuit described in the above embodiment 5 can be configured in a single structure, so that the size reduction can be achieved.

As described above, the embodiment is provided with two secondary coils, allowing the size reduction of the transformer, thereby allowing the size and cost reduction of the circuit.

Embodiment 9

Figure 15:
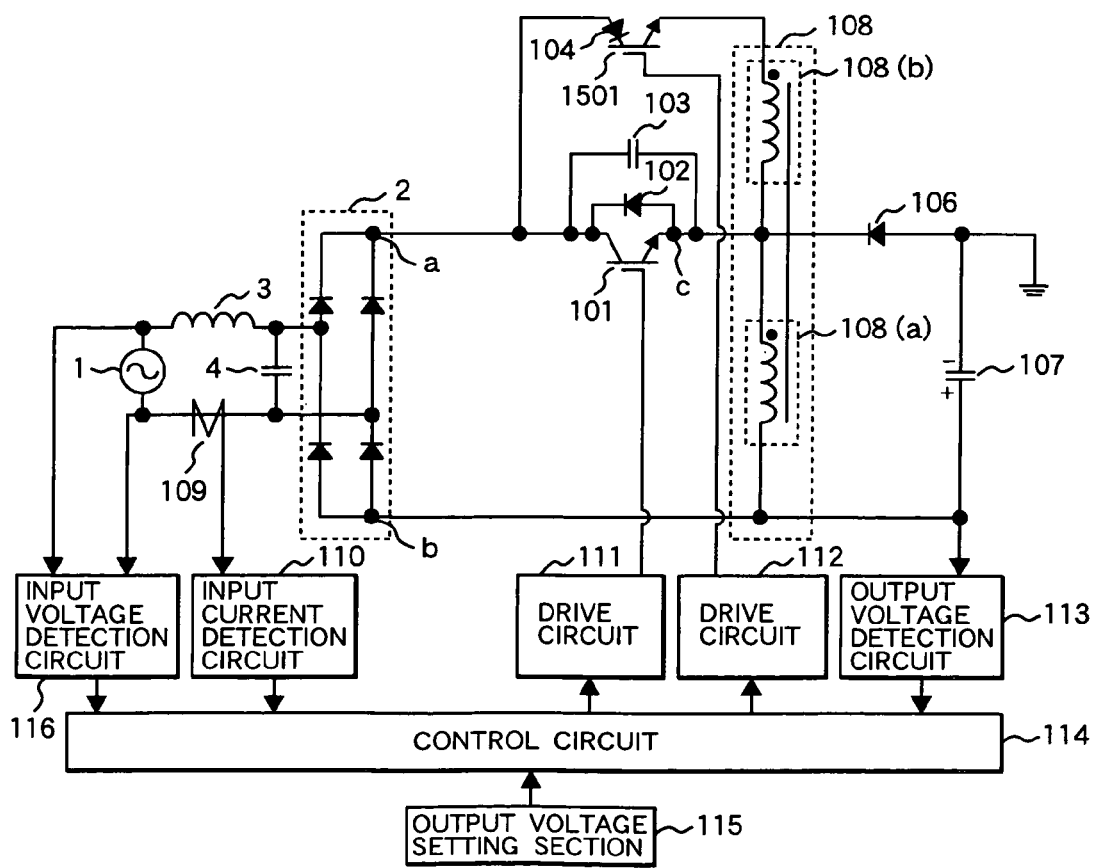
FIG. 15 is a circuit view showing the configuration of a buck-boost converter of a ninth embodiment according to the invention.

FIG. 15 is a circuit view showing a ninth embodiment of the invention. This embodiment shows a buck-boost type of soft switching DC-DC converter. In FIG. 15, the same reference numerals are assigned to the same components as those in FIG. 1.

This embodiment differs from the first embodiment at the point of using an IGBT 1501 with reverse voltage as the switching element. As for the operation, the same configuration as that in the first embodiment can be adopted.

As described above, the embodiment uses the IGBT 1501 with reverse voltage, thereby allowing the diode 104 of the first embodiment to be omitted, and realizing size, cost and loss reductions of the circuit.

Having described embodiments 1 to 9 mainly with the examples of the IBGT, however, the soft switching DC-DC converter is not to be limited to the IGBT, and it will be apparent to those skilled in the art that similar effects could be obtained in the power MOSFET or other insulated gate semiconductor devices, and bipolar transistors.

What is claimed is:

1. A soft switching DC-DC converter for converting an input voltage into another voltage, the converter including a resonant circuit,
wherein the DC-DC converter comprises a buck converter wherein:
a first terminal of a rectification circuit of a power source is connected with a first terminal of a first switching element having a control terminal for controlling a main electric current,
a second terminal of the first switching element and a first terminal of a primary coil of a transformer, comprising the primary coil and a first secondary coil and a second secondary coil, are connected together,
a second terminal of the primary coil of the transformer is connected to a first terminal of a first capacitor,
a second terminal of the first switching element and a first terminal of a first diode are connected together,
a second terminal of the first diode and a second terminal of the rectification circuit are connected together,
a second terminal of the first capacitor and the second terminal of the rectification circuit are connected together,
a second diode and a second capacitor are connected in parallel to the first switching element,
the first terminal of the first switching element and a first terminal of a third diode are connected together,
a second terminal of the third diode is connected with a first terminal of a second switching element having a control terminal for controlling the main electric current,
a second terminal of the second switching element and a first terminal of the first secondary coil of the transformer are connected together,
a second terminal of the first secondary coil of the transformer and the second terminal of the first switching element are connected together, and
wherein the DC-DC converter includes a boost converter wherein:
a second terminal of the primary coil of the transformer is connected with a first terminal of a third switching element having a control terminal for controlling the main electric current,
a second terminal of the third switching element and a second terminal of the rectification circuit are connected together,
the first terminal of the third switching element and a first terminal of a fourth diode are connected together,
a second terminal of the fourth diode and a first terminal of the first capacitor are connected together,
a fifth diode and a third capacitor are connected in parallel to the third switching element,
the first terminal of the third switching element and a first terminal of the second secondary coil of the transformer are connected together,
a second terminal of the second secondary coil of the transformer and a first terminal of a sixth diode are connected together,
a second terminal of the sixth diode is connected with a first terminal of a fourth switching element having a control terminal for controlling the main electric current, and
a second terminal of the fourth switching element and the second terminal of the rectification circuit are connected together, and
wherein the primary coil and the first and second secondary coils are formed from one transformer and wherein the primary coil of the one transformer is commonly used as a choke coil of the boost converter and the buck converter to thereby provide soft switching for the first, second, third and fourth switches, and further comprising at least one drive circuit for controlling on/off operations of the first switching element to provide a buck converting operation for the input voltage while fixing said third switching element to be off and for controlling on/off operations of the third switching element to provide a boost converting operation for the input voltage, while fixing said first switching element to be off.

* * * * *